United States Patent [19]

Goodman et al.

[11] Patent Number: 4,731,931

[45] Date of Patent: Mar. 22, 1988

[54] CALIPER SYSTEM

[75] Inventors: John D. Goodman, Grayson; John M. Christopher, Conyers, both of Ga.

[73] Assignee: Andromeda Technology, Inc., Lawrenceville, Ga.

[21] Appl. No.: 26,107

[22] Filed: Mar. 16, 1987

[51] Int. Cl.$^4$ ............................ G01B 3/20; G01B 5/14
[52] U.S. Cl. .................................... 33/143 M; 33/520
[58] Field of Search ............ 33/143 M, 143 J, 143 K, 33/167, 173, 520

[56] References Cited

U.S. PATENT DOCUMENTS

| | | | |
|---|---|---|---|
| 1,145,852 | 7/1915 | Schramm | 33/143 K |
| 2,467,263 | 4/1949 | Krisanda | 33/143 M |
| 2,529,931 | 11/1950 | Gallup, Sr. | 33/143 M |
| 4,608,759 | 9/1986 | Bowhay | 33/143 M |

FOREIGN PATENT DOCUMENTS

| | | | |
|---|---|---|---|
| 2030765 | 12/1971 | Fed. Rep. of Germany | 33/143 M |
| 901629 | 8/1945 | France | 33/143 J |
| 1062755 | 9/1960 | France | 33/143 M |
| 1376464 | 9/1964 | France | 33/143 M |
| 347009 | 7/1960 | Switzerland | 33/143 M |

OTHER PUBLICATIONS

Mitutoyo Catalog No. 8000, p. 184.

Primary Examiner—Richard R. Stearns
Attorney, Agent, or Firm—Louis T. Isaf

[57] ABSTRACT

An improved caliper apparatus comprises a host caliper including a jaw assembly having two opposing, flat reference edges for measuring edge-to-edge and point-to-point distances; and further includes removable, reference off-setting assemblies which are removably attached to the jaw elements of the host caliper; and which reference off-setting assemblies reposition the reference points of the caliper to provide hole-to-hole and edge-to-hole measurements while maintaining the integrity of the direct reading off the caliper scale.

5 Claims, 11 Drawing Figures

CALIPER SYSTEM

FIELD OF THE INVENTION

The present invention relates generally to the field of precision, measuring instruments and more specifically to calipers used to measure distances between two hole centers or between an edge and a hole center.

BACKGROUND OF THE INVENTION

The industry is proficient in providing precision instruments for measuring distances from point-to-point, and from edge-to-edge. Typical precision calipers include a jaw assembly with two juxtaposed straight edges, one edge indicating the reference point and the other edge indicating the datum point, which edges are moveable relative to one another. When measuring the distance between the centerlines of two holes the user of the typical caliper must undergo a tedious procedure of, for example, measuring the distance between the near edges of the two holes, measuring the diameter of each hole, calculating the radius of each hole and adding the radius of each hole to the distance between the near edges. Such procedures are troublesome and even subject to error if rushed.

At least one prior manufacturer has sought to provide a caliper with jaw elements which are "centered" within the hole during measurement, taking in an effort to acquire hole-to-hole center distance. However, the known prior devices are specially manufactured calipers which function solely to measure between two, hole centers or between an edge and a hole center. They, thus, necessitate owning of a second, typical point-to-point caliper. Furthermore, the known, prior, hole-to-hole calipers still require addition or substraction of fractional values, after reading the scale, for a final measurement when taking other than a hole-to-hole reading.

BRIEF SUMMARY OF THE INVENTION

Briefly described, the present invention is a caliper apparatus which comprises removable attachments to temporarily modify a typical point-to-point caliper, to accurately provide hole-to-hole measurements and edge-to-hole measurements, directly, without calculations or interpretations. In the preferred embodiments, the attachments to the caliper comprise three, interchangeable assemblies including a fixed cone assembly, a sliding cone assembly and an edge stop assembly. The fixed cone assembly and sliding cone assembly are affixed to opposite straight edges of the typical jaw assembly for measuring hole-to-hole distance. The fixed cone assembly and edge stop assembly are affixed to the opposite straight edges of the typical jaw assembly for measuring hole-to-edge distance.

The cone assemblies each include a conical end which self-centers in the hole to be measured and positions the caliper reference point (or datum point, respectively) at the hole center. Using the present invention, the distance between two holes of different diameter is measurable. The sliding cone assembly assists in compensating for the larger size hole. The attachments of the present invention are so structured that the distances between the reference points of the cone assemblies and the edge stop assembly, respectively, are accurately read directly off the scale of the host caliper, without modification.

Therefore, it is an object of the present invention to provide a caliper apparatus that accurately measures point-to-point, edge-to-edge, hole-to-hole and edge-to-hole distance.

Another object of the present invention is to provide a caliper apparatus which can accomplish all of the above-mentioned measurements and indicate a true reading of the distance on its scale; without the need for calculations and modifications.

Yet another object of the present invention is to provide attachment devices to convert existing point-to-point callipers to hole-to-hole and hole-to-edge calipers as well.

Other objects, features and advantages of the present invention will become apparent upon reading and understanding this specification in conjunction with the accompanying drawings.

DETAILED DESCRIPTION OF THE PREFERRED EMBODIMENTS

Figure 1:
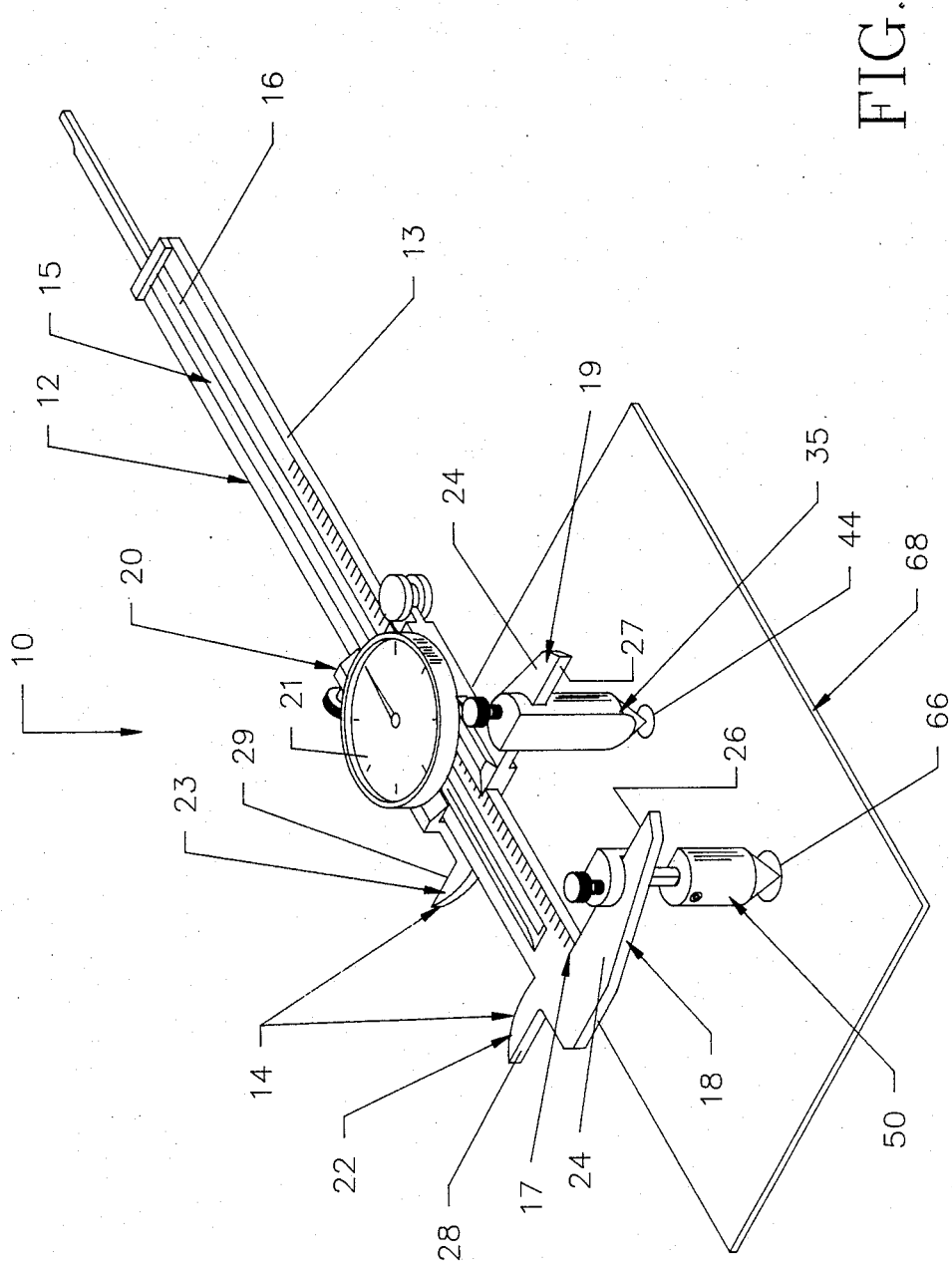
FIG. 1 is a pictorial view of the improved caliper system in accordance with the present invention, outfitted in the hole-to-hole embodiment.

Referring now, in greater detail to the drawings in which like numerals represent like components throughout the several views, FIG. 1 shows an Improved Caliper Apparatus 10 comprising a host caliper 12 to which is attached a fixed cone assembly 35 and a sliding cone assembly 50. The host caliper 12 includes an elongated beam 13 and a jaw assembly 14 mounted on the beam. Running along the length of the beam 13, in a central channel 15, is a track element 16. Marked off along the length of the beam 13 is a linear scale 17. The jaw assembly 14 includes a first jaw element 18 attached at one end of the beam 13. A second jaw element 19 is mounted on a carriage 20 which travels along the length of the beam 13. Mounted on the carriage 20 is a dial scale 21 which rotates in controlled measureable degrees of rotation as the carriage 20 moves along the beam 13. The dial scale 21 interacts with the track element 16, in the preferred embodiments, by way of a rack and pinion connecton (not seen) to assure accurate relationship between the lineal movement of the carriage 20 and rotational movement of the dial scale 21.

The jaw assembly 14 also includes a first rear jaw element 22 and a second rear jaw element 23.

Preferrably, each of the jaw elements 18, 19, 22, 23 includes a flat upper surface 24 and a flat lower surface (not seen). Each jaw element includes a reference edge (26, 27, 28, 29 respectively) which reference edge is a flat, planer surface being, preferrably, perpendicular to the beam 13. The general operation of the carriage 20, jaw assembly 14, track element 16, linear scale 17 and dial scale 21 is known in the art and only those aspects necessary for clear understanding of the present invention will be reexamined in this specification.

In the preferred embodiment of the present invention, the reference edge 26 of the first jaw element 18 and the reference edge 28 of the first rear jaw element 22 are aligned with the "O" mark of the linear scale 17, thus serving as the datum (or beginning) point for any distance measurement. The reference edge 27 of second jaw element 19 and reference edge 29 of second rear jaw element 23 are inline with one another and move with the carriage 20 to represent the reference (or ending) point of a distance measured by the host caliper 12. The exact distance between the datum point (referenced edges 26 and 28) and the ending point (reference edges 27 and 29) is accurately displayed by reading the combination of the linear scale 17 and dial scale 21, as known in the art.

Figure 3C:
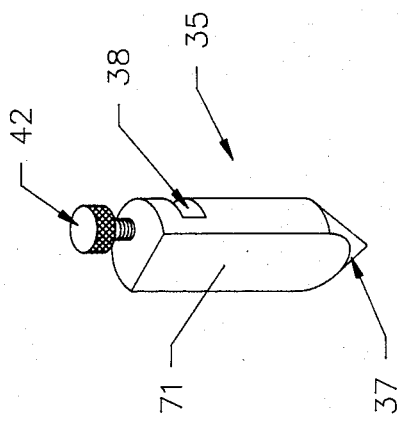
FIG. 3C is a pictorial view of the fixed cone assembly of FIG. 3A.
Figure 3B:
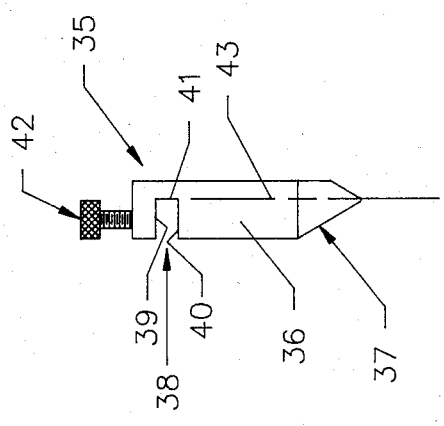
FIG. 3B is a side view of the fixed cone assembly of FIG. 3A.
Figure 3A:
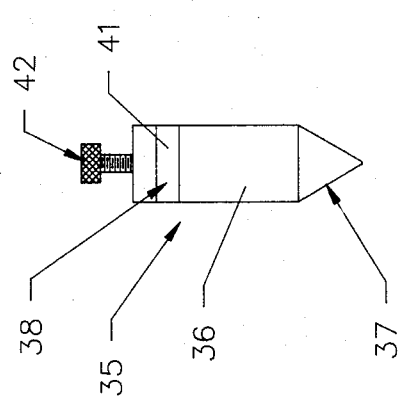
FIG. 3A is a front view of a fixed cone assembly in accordance with the present invention.

With reference to FIGS. 3A–3C, the fixed cone assembly 35 is seen as including a "generally cylindrical" body part 36 which has a cone-shaped portion 37 at one end and a slot 38 formed in the other end to accept a caliper jaw element 18, 19, 22, 23 therein. In the embodiment of FIG. 1, the fixed cone assembly 35 is seen mounted on the second jaw element 19. The fixed cone assembly 35 is held in place on the second jaw element 19 by a thumb screw tightened against the jaw element. With reference to FIG. 3B, the slot 38 is, in the preferred embodiments, a rectangular slot having an upper surface 39, a lower surface 40 and a back wall 41. The back wall 41 is seen as being a flat, planer surface. Again, with reference to FIG. 3B, the axis of symmetry 43 of the cone shaped portion 37 is in-line with (lying in the same plane as) the back wall 41 of the slot 38. With reference again to FIG. 1, it is seen that the reference edge 27 of the second jaw element 19 is in abutment with and parallel to the back wall 41 of the slot 38. Thus, the axis 43 of the cone-shaped portion 37 is in-line with the reference edge 27 of the jaw element 19, whereby the axis of symmetry 43 of the fixed cone assembly 35 now functions as the ending reference point for the caliper measurement. The cone-shaped end 37 will self-center in a hole 44 to be measured and, thus, position the ending reference point of the caliper at the hole center. In this way, the reading indicated by reference edge 27 on the linear scale 17 and dial scale 21 will correspond exactly to the distance of the hole center line from the datum point (reference edge 18).

Figure 4A:
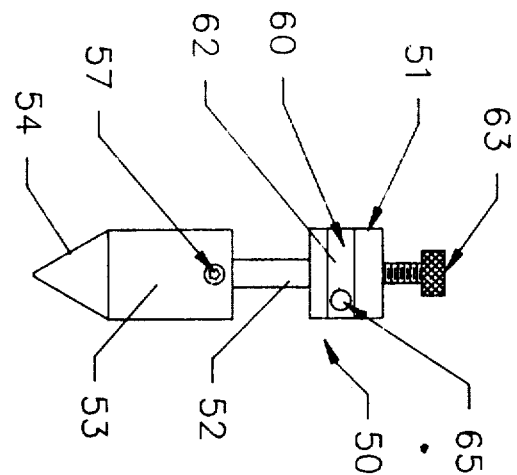
FIG. 4A is a front view of a sliding cone assembly in accordance with the present invention.
Figure 4B:
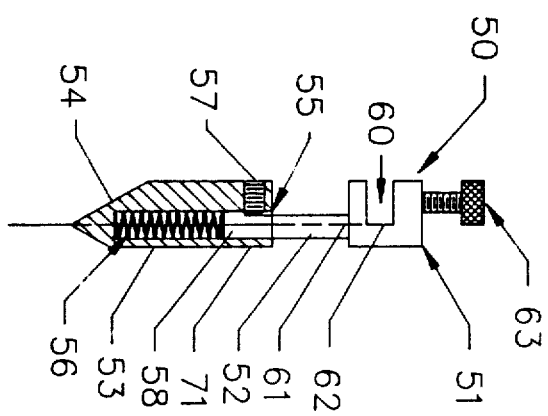
FIG. 4B is a side view of the sliding cone assembly of FIG. 4A, with a portion thereof cut away.
Figure 4C:
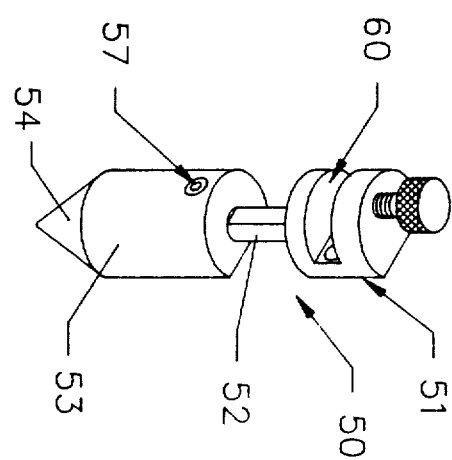
FIG. 4C is a pictorial view of the sliding cone assembly of FIG. 4A.

With reference to FIGS. 4A–4C, the sliding cone assembly 50 is seen as including a gripping portion 51, a slide bar 52 rigidly attached to the gripping portion 51, and a generally cylindral body part 53 slidably mounted on the slide bar. At the lower end of the body part 53 is a cone-shaped portion 54. A cavity 55 which accepts the slide bar 52 is formed in the upper end of the body part 53 and a spring 56 is installed in the cavity. The slide bar 52 is formed with a foot 58 at its lower end. A set screw 57 prevents passage of the foot 58 thus retaining the body part 53 in sliding fashion on the slide bar 52. The spring 56 exerts a downward pressure biasing the body part 53 away from the gripping portion 51. The gripping portion 51 of the sliding cone assembly 50 is formed with a slot 60 similar in structure to the slot 38 of the fixed cone assembly 35. As with the fixed cone assembly 35, the axis of symmetry 61 of the cone-shaped portion 54 of the sliding cone assembly 50 is in-line (lying in the same plane) with the flat back wall 62 of the gripping portion 51. With reference to FIG. 1, the sliding cone assembly 50 is seen mounted on the first jaw element 18 opposite the fixed cone assembly 35. The gripping portion 51 is mounted with the back wall 62 in abutment with the reference edge 26 of the jaw element 18. The gripping portion 51 is held by a thumb screw 63 to the jaw element 18. The slot 60, in a manner similar to that described for the fixed cone assembly 35 above, positions the axis of symmetry 61 of the sliding cone assembly 50 inline with the reference edge 26 and, thus, the axis 61 of the cone shaped portion 54 functions as the datum (beginning) point in-line with the "O" mark on the linear scale 17. The relative position of the datum point established by the sliding cone assembly 50 can be adjusted for manufacturing tolerances and caliper alignment by a second set screw 65 extending through the back wall 62 of the slot 60. The cone-shaped end 54 of the sliding cone assembly 50 will self-center in the hole 66 from which measurement is taken and, thereby, the datum point of the caliper 12 will be at the hole center.

When measuring the distance between the two holes, the caliper apparatus 10 is outfitted as shown in FIG. 1; and the two cone assemblies 35, 50 are placed in the holes 44, 66. The distance read off the caliper scales 17, 21 will be identical to the distance between the center lines of the two holes 44, 66. The present invention is also used to measure the distance between the center lines of two different sized holes. The preferrable method for accomplishing this measurement is to place the cone-shaped portion 37 of the fixed cone assembly 35 in the hole 44 of lesser diameter and place the cone-shaped portion 54 of the sliding cone assembly 50 in the hole 66 of greater diameter. The sliding body part 53 is automatically, by action of the spring 56, moved down the slide bar 52 to seat the cone-shaped portion 54 in the larger hole 66. This allows the user to keep the caliper beam 13 parallel to the plane of the measured material 68 to, thus, assist in acquiring the most accurate reading.

With references to FIGS. 2 and 5A–5C, an alternate embodiment of the improved caliper apparatus 10 is seen as including an edge stop assembly 80 mounted to the first jaw element 18 in place of the sliding cone assembly 50. The edge stop assembly 80 includes a generally cylindrical body part 81. At the upper end of the body part 81, a slot 82 is formed. The slot 82 is similar in structure to that of the fixed cone assembly 35 and the sliding cone assembly 50. The edge stop assembly 80 also includes a flat surface 83 formed in the body part 81.

Figure 5A:
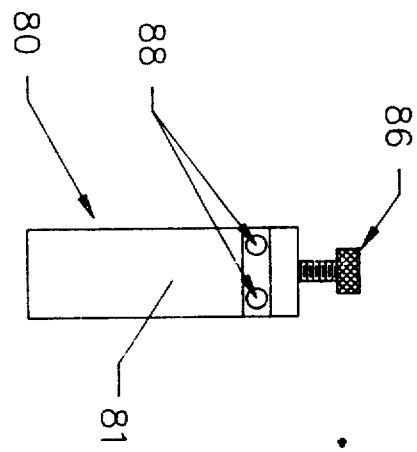
FIG. 5A is a front view of an edge stop assembly in accordance with the present invention.
Figure 5B:
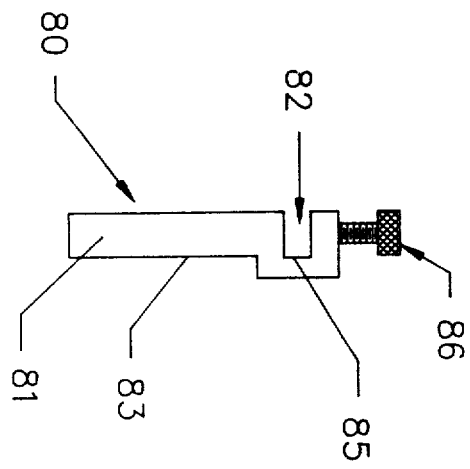
FIG. 5B is a side view of the edge stop assembly of FIG. 5A.

The flat surface 83 defines a plane which is in alignment (coplaner) with the flat, planer back wall 85 of the slot (see FIG. 5B). The edge stop assembly 80 is attached to the caliper jaw element 18 opposite the fixed cone assembly 35. The edge stop assembly 80 is held against the jaw element 18 by a thumb screw 86. As with the sliding cone assembly 50, the back wall 85 of the slot 82 is positioned in abutment with and parallel to the reference edge 26, and, thus, the flat surface 83 is positioned in-line with the datum (beginning) point of the caliper 12. The flat surface 83 corresponds with the "O" mark of the linear scale 17. Two set screws 88 extend through the back wall 85 of the slot 80 to adjust for manufacturing tolerances and caliper jaw alignment. The set screws 88 are adjusted an equal amount to insure that the flat surface 83 is parallel to the material edge 90 of the item 91 to be measured.

When measuring the distance between a material edge 90 and a hole 92, the edge stop assembly 80 is placed at the material edge 90 with the flat surface 83 flush against the material edge 90; and the fixed cone assembly 35 is placed in the hole 92. (Refer to FIG. 2.) The fixed cone assembly 35 is lowered into the hole 92 until the cone-shaped portion 37 is seated in the hole, and thus, the axis 43 of the cone is aligned with the center line of the hole 92. The flat surface 83 of the edge stop assembly 80 is sufficiently long to allow up and down movement along the material edge 90 in order that the caliper beam 13 can be maintained, as much as possible, parallel to the plan of the item 91 to be measured. With the edge stop assembly 80 and the fixed cone assembly 35 so positioned, the distance indicated on the linear scale 17 and dial scale 21 will be identical to the distance from the material edge 90 to the center line of the hole 92.

It can be seen, that by use of the present invention, the reference points, datum point and ending point, which are typically located along the reference edges 26, 27, 28, 29 of the host caliper 12 are "off-set" so that the datum and ending point can be located at and along the axis of symmetry 43, 61 of the cone assembly 35, 50 and along the flat surface 83 of the edge stop assembly 80.

Figure 2:
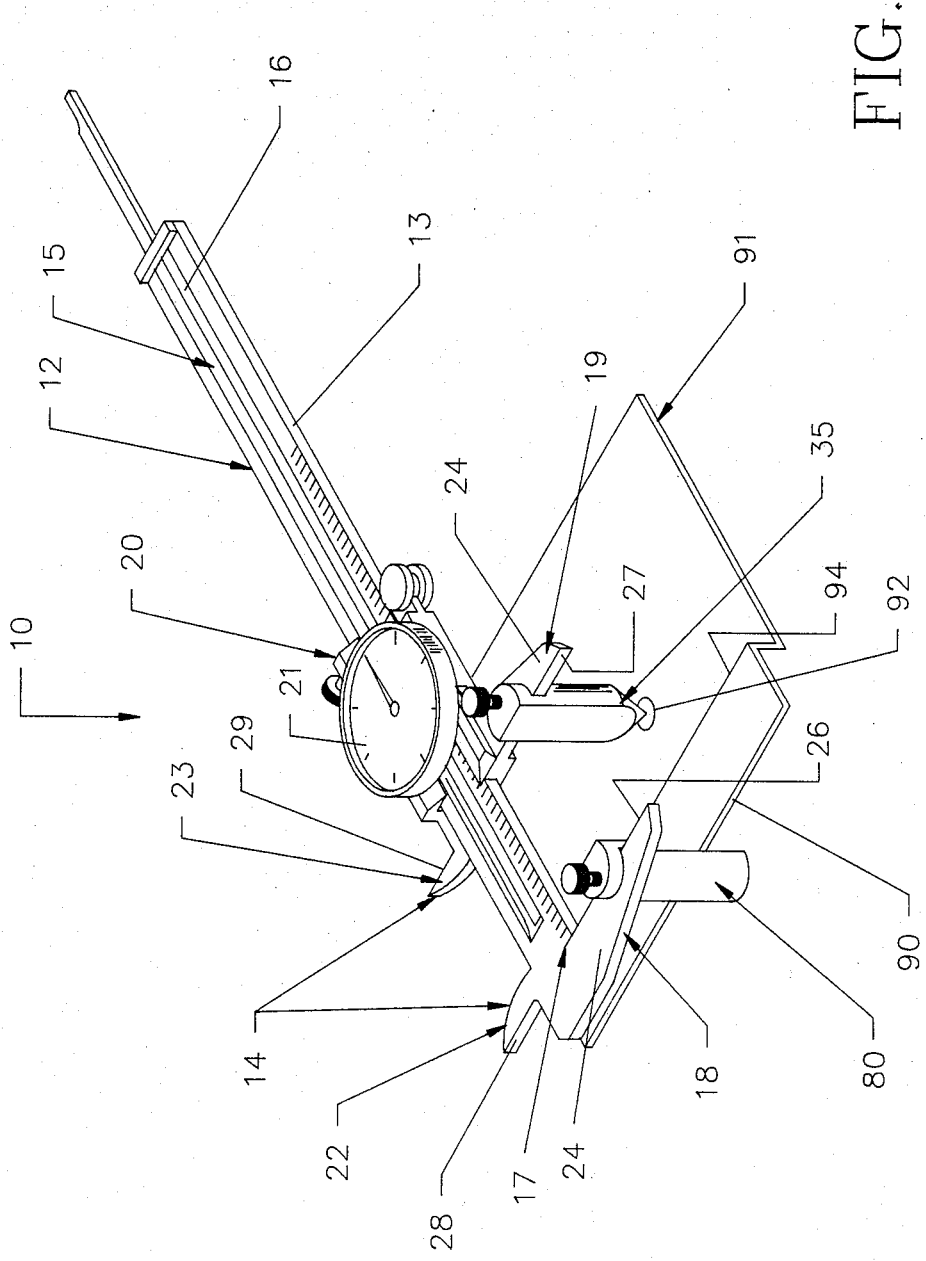
FIG. 2 is a pictorial view of the improved caliper system of FIG. 1, depicting the hole-to-edge embodiment.

The caliper apparatus 10 of the embodiment of FIG. 2 is seen as measuring the distance between an outer, material edge 90 and the centerline of the hole 92. An alternate embodiment of the caliper apparatus 10 of the present invention measures the distance from an inner, material edge, such as that edge indicated as 94 in FIG. 2. In this embodiment, the edge stop assembly 80 is mounted to the first rear jaw element 22 of the host caliper 12 at its reference edge 28 and the fixed cone assembly 35 is mounted to the second rear jaw element 23 at its reference edge 29. The remaining operation is as discussed above.

Figure 5C:
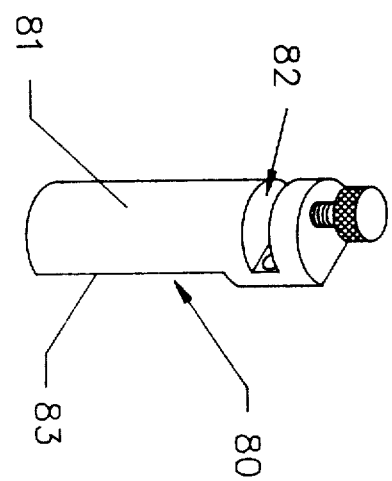
FIG. 5C is a pictorial view of the edge stop assembly of FIG. 5A.

As used throughout this specification and related claims, the term "generally cylindrical" refers to a configuration which ranges from a true cylinder to something less, yet partially cylindrical, as depicted by FIG. 3C, 4C and 5C. The "generally cylindrical" body parts 36, 53, 81 are, in the preferred embodiments, not completely cylindrical; but, rather, the generally cylindrical body parts are formed with a flat edge 71. The end profile of the generally cylindrical body parts define, preferrably, slightly greater than a semi-circle. In alternate embodiments, the "generally cylindrical" body parts are, indeed, fully cylindrical, except for the edge stop assembly 80 which includes the flat surface 83. Likewise, the "cone-shaped portions" 37, 54 range in alternate embodiments from a full cone to a partial cone as depicted in FIGS. 3B, 3C and 4B. The end profile of the cone-shaped portions correspond to the end profile of the generally cylindrical parts 36, 53; that is, preferably, greater than a semi-circle.

Whereas the host caliper 12 of this specifiction is described as a particular type of caliper, with particular numerical indicators of the relative distance (i.e. linear scale 17 and dial scale 21), it is understood that host calipers of various other designs are allowable and various other numerical indicators of distance (such as vernier scales and digital displays) are allowable, within the spirit and scope of the invention.

Whereas the present invention has been described herein with particular reference to preferred embodiments thereof, it will be understood that variations and modifications can be effected within the spirit and scope of the invention, as described hereinbefore and as defined in the appended claims.

We claim:

1. A caliper apparatus, comprising:
   an elongated beam member;
   first jaw element mounted to said beam member, said first jaw element defining a first reference edge;
   second jaw element mounted to said beam member for movement along the length of said beam member, said second jaw element defining a second reference edge;
   said first reference edge and said second reference edge defining a variable distance between them;
   distance indicating means for numerically indicating said variable distance,
   first off-setting means attached to said first jaw element for defining a first off-set reference;
   second off-setting means attached to and movable with said second jaw element for defining a second off-set reference;
   said first off-set reference and said second off-set reference defining a variable distance between them which distance corresponds to said variable distance between said first reference edge and said second reference edge;
   wherein said first off-setting means comprises: a body portion, said body portion including a free end displaced from said first jaw element; and a cone-shaped portion extending from said free end of said body portion, the axis of symmetry of said cone-shaped portion lying in the plane defined by said first reference edge, said axis of symmety defining said first off-set reference, whereby, upon insertion of said cone-shaped portion into a hole, the off-set reference is colinear with the centerline of the hole;
   wherein said second off-setting means comprises: a body portion, said body portion including a free end displaced from said second jaw element; and a cone-shaped portion extending from said free end of said body portion, the axis of symmetry of said cone-shaped portion lying in the plane defined by said second reference edge, said axis of symmetry defining said second off-set reference, whereby, upon insertion of said cone-shaped portion into a hole, the off-set reference is colinear with the centerline of the hole; and
   wherein at least one of said first and second off-setting means further comprises: a bar member protruding from the respective said jaw element; said body portion slidably mounted on said bar member; spring means for biasing said body portion to a position along said bar member displaced from said jaw element; and retention means for retaining said body portion slidably mounted on said bar member.

2. In a caliper apparatus for measuring the distance between two points, which caliper apparatus includes an elongated beam member, a first jaw element mounted to the beam member, which first jaw element includes a plate and a reference edge on the plate, and a second jaw element mounted to the beam member for movement along the length of the beam member, which second jaw element includes a plate and a reference edge on the plate; the improvement thereto being a hole-to-hole measuring attachment for modifying the caliper apparatus to measure the distance between the centerlines of two holes, said hole-to-hole measuring attachment comprising:

a first cone assembly removably attached to the first jaw element, said first cone assembly comprising a body portion, a cone-shaped end portion defined at one end of said body portion, and a jaw gripping portion defined at the other end of said body portion, said jaw gripping portion including a slot formed in said cone assembly, said slot including a flat back wall, the plate of the first jaw element occupying said slot and said flat backwall abutting the reference edge of the first jaw element, said gripping portion further including locking means for releasably locking said first cone assembly to the first jaw element, said cone-shaped portion defining an axis of symmetry lying in the plane defined by said flat back wall of said gripping portion, whereby upon insertion of the cone-shaped portion into a hole to be measured, the centerline of the hole is in-line with the reference edge of the first jaw element; and a second cone assembly removably attached to the second jaw element, said second cone assembly comprising a body portion, a cone-shaped end portion defined at one end of said body portion, and a jaw gripping portion defined at the other end of said body portion, said jaw gripping portion including a slot formed in said cone assembly, said slot including a flat back wall, the plate of the second jaw element occupying said slot and said flat backwall abutting the reference edge of the second jaw element, said gripping portion further including locking means for releasably locking said second cone assembly to the second jaw element, said cone-shaped portion defining an axis of symmetry lying in the plane defined by said flat back wall of said gripping portion, whereby upon insertion of the cone-shaped portion into a hole to be measured, the centerline of the hole is in-line with the reference edge of the second jaw element; and wherein one of said first and second cone assemblies further comprises: a bar member attached to and protruding from said gripping portion; said body portion slidably mounted on said bar member; spring means for biasing said body portion away from said gripping portion; and retention means for retaining said body portions slidably mounted on said bar member.

3. A reference off-setting device for displacing the effective reference edge of a caliper jaw, said off-setting device comprising:

a body portion for attachment to a caliper jaw;

gripping means for attaching said body portion to a caliper jaw;

a cone-shaped portion extending from said body portion, said gripping means and said cone-shaped portion cooperating such that the axis of symmetry of said cone-shaped portion lies in the plane defined by the reference edge of a caliper jaw to which said body portion is attached;

a bar member associated with said gripping means for protrusion from the caliper jaw;

a cavity formed in said body portion, said body portion slidably mounted on said bar member with said bar member received within said cavity;

a spring means for biasing said body portion to a position along said bar member displaced from said gripping means; and retention means for retaining said body portion slidably mounted on said bar member.

4. A reference off-setting device for displacing the effective reference edge of a caliper jaw, said off-setting device comprising:

an elongated body portion;

a gripping portion at one end of said body portion, said gripping portion including a slot formed therein, said slot including an upper wall, a lower wall and a flat back wall, and locking means for releasably locking said gripping portion to an object within said slot;

a cone-shaped end portion at the other end of said body portion, said cone-shaped end portion defining an axis of symmetry lying in the plane defined by said flat back wall of said gripping portion;

a bar member attached to and protruding from said gripping portion;

said body portion slidably mounted on said bar member;

spring means for biasing said body portion away from said gripping portion; and retention means for retaining said body portion slidably mounted on said bar member.

5. Off-setting device of claim 4, wherein said body portion is generally cylindrical.

* * * * *

UNITED STATES PATENT AND TRADEMARK OFFICE
CERTIFICATE OF CORRECTION

PATENT NO.  : 4,731,931

DATED       : March 22, 1988

INVENTOR(S) : John D. Goodman, John M. Christopher

Page 1 of 3

It is certified that error appears in the above-identified patent and that said Letters Patent is hereby corrected as shown below:

Include Figures 4A, 4B, 4C, 5A, 5B, and 5C , as part of Letters Patent.

Signed and Sealed this

Sixteenth Day of August, 1988

Attest:

DONALD J. QUIGG

Attesting Officer

Commissioner of Patents and Trademarks